(12) United States Patent
Chen et al.

(10) Patent No.: US 12,568,142 B2
(45) Date of Patent: Mar. 3, 2026

(54) SHARED SENSOR GRID AND METHOD FOR SHARING SENSOR GRID

(71) Applicant: Airbus Operations GmbH, Hamburg (DE)

(72) Inventors: Bing Chen, Hamburg (DE); Bruno Fernandes, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/493,956

(22) Filed: Oct. 25, 2023

(65) Prior Publication Data

US 2024/0146809 A1 May 2, 2024

(30) Foreign Application Priority Data

Oct. 28, 2022 (EP) ..................................... 22204455

(51) Int. Cl.
| | |
|---|---|
| *H04L 67/12* | (2022.01) |
| *H04L 12/40* | (2006.01) |
| *H04L 12/403* | (2006.01) |
| *H04W 4/38* | (2018.01) |
| *H04W 84/18* | (2009.01) |
| *B64C 13/00* | (2006.01) |
| *H04W 84/06* | (2009.01) |

(52) U.S. Cl.
CPC ............. *H04L 67/12* (2013.01); *H04L 12/403* (2013.01); *H04L 2012/4028* (2013.01)

(58) Field of Classification Search
CPC .................. H04L 67/12; H04L 12/403; H04L 2012/4028; H04L 12/40; B64C 13/00; H04W 84/06; H04W 84/18; H04W 4/38
See application file for complete search history.

(56) References Cited

U.S. PATENT DOCUMENTS

| | | | |
|---|---|---|---|
| 8,600,584 B2 | 12/2013 | Fervel et al. | |
| 2011/0299470 A1 | 12/2011 | Müller et al. | |

(Continued)

FOREIGN PATENT DOCUMENTS

| FR | 2943037 A1 | 9/2010 |
|---|---|---|

OTHER PUBLICATIONS

European Search Report for corresponding European Patent Application No. 22204455 dated Apr. 18, 2023; priority document.

*Primary Examiner* — Kamal M Hossain

(74) *Attorney, Agent, or Firm* — Greer, Burns & Crain, Ltd.

(57) ABSTRACT

A network, a particularly on board of an aircraft, such as a cabin network or a cargo bay network, comprises at least one central signaling backbone, a plurality of distributed sensor nodes connected to the central signaling backbone, and a plurality of network devices connected to the central signaling backbone. Each of the plurality of distributed sensor nodes includes one or more sensors configured to gather sensor measurement values and to route the gathered sensor measurement values over the central signaling backbone. Each of the plurality of network devices is configured to send a sensor control signal to one or more of the plurality of distributed sensor nodes, the sensor control signal triggering the receiving sensor node to send selected sensor measurement values over the central signaling backbone to the sending network devices based on the content of the sent sensor control signal.

16 Claims, 2 Drawing Sheets

(56)     References Cited

U.S. PATENT DOCUMENTS

| | | | |
|---|---|---|---|
| 2013/0131837 A1* | 5/2013 | Washington .......... | F24F 13/068 |
| | | | 700/12 |
| 2015/0200863 A1* | 7/2015 | Wu ..................... | G06F 16/1805 |
| | | | 709/223 |
| 2016/0037136 A1* | 2/2016 | Hamilton ................ | H04N 5/33 |
| | | | 702/189 |
| 2016/0270052 A1* | 9/2016 | Dame .................... | H01Q 1/521 |
| 2018/0007137 A1 | 1/2018 | Watson et al. | |
| 2018/0118376 A1* | 5/2018 | Ehrstein ................ | G07C 5/008 |
| 2023/0230424 A1* | 7/2023 | Al-Khairy .............. | H02M 3/00 |
| | | | 701/31.4 |

* cited by examiner

100

SHARED SENSOR GRID AND METHOD FOR SHARING SENSOR GRID

CROSS-REFERENCES TO RELATED APPLICATIONS

This application claims the benefit of the European patent application No. 22204455.4 filed on Oct. 28, 2022, the entire disclosures of which are incorporated herein by way of reference.

FIELD OF THE INVENTION

The invention relates to a sensor grid connected to a network, the sensors of which may be open to shared access by nodes of the network, particularly for use in aviation networks. Moreover, the invention relates to a method for sharing a sensor grid connected to a network, particularly for use on board of an aircraft in aviation networks.

BACKGROUND OF THE INVENTION

An exemplary networking standard for handling of data in an aircraft is referred to as AFDX™ (Avionics Full DupleX network). An AFDX network is a switched full duplex network based on Ethernet network technology (based on the IEEE 802.3 standard). AFDX networks are typically fully compliant with Part 7 of ARINC 664 (one of the standards provided by Aeronautical Radio, Incorporated or "ARINC").

A more generalized approach to interconnectivity between network elements in an aircraft over an Internet-of-Things (IoT) backbone is desirable. Such interconnectivity require a high degree of standardization, while maintaining high flexibility in system design.

Document FR 2 943 037 A1 discloses an aircraft control system in which a plurality of elementary control systems, corresponding to different aircraft functions, share one or more sensors over a common AFDX network. The transmission of commands is carried out via AFDX messages sent to network-subscribed actuators.

SUMMARY OF THE INVENTION

One of the objects of the invention is to find improved solutions for network designs with sensor capabilities being flexibly adaptable to different use case scenarios.

In pursuit of those objects, the intention is to generate new services for airlines, aircraft operators and/or passengers, such as, for example but not limited to, optimization of turn-around times, capabilities for predictive maintenance, cargo tracking, reduction of boarding and de-boarding times, improvements in passenger experience, and the like. With the present invention, different use cases may be flexibly implemented by employing a pre-designed use-case agnostic grid of sensors the capabilities and/or data output of which may be commonly shared among other network devices interconnected over the same network backbone. The solutions according to the present invention lead to significant cost and weight reduction in implementing different IoT use cases on board of an aircraft, while opening up the possibilities in use case design for future application using the same pre-designed sensor grid.

According to a first aspect of the invention, a network, particularly on board of an aircraft, such as a cabin network or a cargo bay network, comprises at least one central signaling backbone, a plurality of distributed sensor nodes connected to the at least one central signaling backbone, and a plurality of network devices connected to the at least one central signaling backbone. Each of the plurality of distributed sensor nodes includes one or more sensors configured to gather sensor measurement values and to route the gathered sensor measurement values over the at least one central signaling backbone. Each of the plurality of network devices is configured to send a sensor control signal to one or more of the plurality of distributed sensor nodes, the sensor control signal triggering the receiving sensor node to send selected sensor measurement values over the at least one central signaling backbone to the sending network devices based on the content of the sent sensor control signal.

According to a second aspect of the invention, a method for sharing a sensor grid connected to at least one central signaling backbone in a network, particularly on board of an aircraft, comprises the steps of: sending, by a plurality of network devices connected to the at least one central signaling backbone, sensor control signals to one or more of a plurality of distributed sensor nodes in the sensor grid over the central signaling backbone; gathering sensor measurement values using one or more sensors of the plurality of distributed sensor nodes; and sending, by the one or more of the plurality of distributed sensor nodes receiving the sensor control signals, selected sensor measurement values over the at least one central signaling backbone to the sending network devices based on the content of the sent sensor control signal.

According to a third aspect of the invention, an aircraft, in particular a passenger aircraft, comprises a network with a shared sensor grid according to the first aspect of the invention.

Advantageous configurations and refinements will become understood from the further dependent claims and from the description with reference to the figures.

According to some embodiments of the first aspect of the invention, the network may further comprise a data storage connected to the central signaling backbone and configured to at least temporarily store gathered sensor measurement values of each of the plurality of distributed sensor nodes. In some embodiments thereof, the data storage may be configured to time-stamp gathered sensor measurement values adjusted to pre-defined latency values in communication between the corresponding distributed sensor node and the data storage. Additionally or alternatively, the data storage may be configured to collate a number of gathered sensor measurement values of different ones of the plurality of distributed sensor nodes having a similar type of sensors and to output a collated set of gathered sensor measurement values as the selected sensor measurement values over the at least one central signaling backbone.

According to some embodiments of the first aspect of the invention, the sensors of the plurality of distributed sensor nodes may include one or more of detectors for smoke, heat, gas, flames, carbon monoxide, motion or light, detectors that measure temperature, humidity, carbon dioxide, or ambient light, detectors that may determine occupancy, presence or identity sensors, moving or still image capturing devices and microphones.

According to some embodiments of the first aspect of the invention, the at least one central signaling backbone may be an Ethernet backbone. Alternatively or additionally, the sensor nodes may also be connected to the at least one central signaling backbone via a wireless communication protocol, such as for example WiFi, an IEEE 802.15.4 protocol, Bluetooth® or Bluetooth Low Energy. In some embodiments thereof, the sensor control signals may be IPv4 packets, IPv6 packets, Ethernet Powerlink packets, PPPoE packets, MPLS packets, WiFi packets, IEEE 802.15.4 packets, Bluetooth® packets or Bluetooth® Low Energy packets. Generally, the sensor grid may be operated using non-IP addressing schemes or may utilize a hybrid protocol using both IP and non-IP addressing schemes.

According to some embodiments of the second aspect of the invention, the method may further comprise a step of temporarily storing gathered sensor measurement values of each of the plurality of distributed sensor nodes in a data storage connected to the central signaling backbone.

According to some embodiments of the second aspect of the invention, the sent sensor control signals may include an access priority classification and sensor configuration information for controlling sensor measurement parameters of sensors of the plurality of distributed sensor nodes. In some embodiments thereof, gathering the sensor measurement values by the plurality of distributed sensor nodes may be performed by setting the sensor measurement parameters of the sensors according to the sensor configuration information in the received sensor control signals. Additionally or alternatively, gathering the sensor measurement values by the plurality of distributed sensor nodes may be performed in line with the received sensor control signals having the highest access priority classification.

In a fourth aspect of this disclosure, a network, particularly on board of an aircraft, such as a cabin network or a cargo bay network, comprises at least one central signaling backbone, a plurality of distributed sensor nodes connected to the at least one central signaling backbone, each of the plurality of distributed sensor nodes comprising one or more sensors configured to gather sensor measurement values and to route the gathered sensor measurement values over the at least one central signaling backbone, a plurality of network devices connected to the at least one central signaling backbone, and a grid controller connected to the at least one central signaling backbone. The plurality of network devices are configured to send sensor control signals for requesting access to one or more sensors of one of the plurality of distributed sensor nodes to the grid controller. The grid controller is configured to trigger the receiving sensor nodes to send selected sensor measurement values over the at least one central signaling backbone to the requesting network devices based on the sensor control signals received from the requesting network devices.

In a fifth aspect of this disclosure, a method for sharing a sensor grid connected to at least one central signaling backbone in a network, particularly on board of an aircraft, comprises the steps of: sending, by a plurality of network devices connected to the at least one central signaling backbone, sensor control signals to a grid controller over the central signaling backbone; gathering sensor measurement values using one or more sensors of a plurality of distributed sensor nodes; and sending, by one or more of the plurality of distributed sensor nodes, selected sensor measurement values over the at least one central signaling backbone to the sending network devices based on the grid controller triggering the one or more of the plurality of distributed sensor nodes depending on the sensor control signals received from the sending network devices.

In a sixth aspect of this disclosure, a network, particularly on board of an aircraft, such as a cabin network or a cargo bay network, comprises at least one central signaling backbone, a plurality of distributed sensor nodes connected to the at least one central signaling backbone, each of the plurality of distributed sensor nodes comprising one or more sensors configured to gather sensor measurement values and to route the gathered sensor measurement values over the at least one central signaling backbone, a data storage connected to the central signaling backbone and configured to at least temporarily store gathered sensor measurement values of each of the plurality of distributed sensor nodes, and a plurality of network devices connected to the at least one central signaling backbone and configured to retrieve gathered sensor measurement values of at least some of the plurality of distributed sensor nodes from the data storage over the at least one central signaling backbone.

In a seventh aspect of this disclosure, a method for sharing a sensor grid connected to at least one central signaling backbone in a network, particularly on board of an aircraft, comprises the steps of: gathering sensor measurement values using one or more sensors of a plurality of distributed sensor nodes connected to the at least one central signaling backbone; temporarily storing gathered sensor measurement values of each of the plurality of distributed sensor nodes in a data storage connected to the at least one central signaling backbone; and retrieving, by one or more of a plurality of network devices connected to the at least one central signaling backbone, selected sensor measurement values from the data storage over the at least one central signaling backbone.

An aircraft, in particular a passenger aircraft, may comprise a network with a shared sensor grid according to the fourth or sixth aspect of the disclosure.

Although here, in the foregoing and also in the following, some functions are described as being performed by modules or network elements, it shall be understood that this does not necessarily mean that such modules are provided as entities separate from one another. In cases where one or more modules are provided as software, the modules may be implemented by program code sections or program code snippets, which may be distinct from one another but which may also be interwoven or integrated into one another.

Similarly, in cases where one or more modules are provided as hardware, the functions of one or more modules may be provided by one and the same hardware component, or the functions of several modules may be distributed over several hardware components, which need not necessarily correspond to the modules. Thus, any apparatus, system, method and so on which exhibits all of the features and functions ascribed to a specific module shall be understood to comprise, or implement, that module.

The above configurations and refinements may be combined with one another as desired where expedient. Further possible embodiments, refinements and implementations of the invention also encompass combinations, which are not explicitly mentioned, of features of the invention described above or below with regard to the exemplary embodiments. In particular, a person skilled in the art will also add individual aspects as improvements or additions to the respective basic form of the present invention.

BRIEF DESCRIPTION OF THE DRAWINGS

The present invention will be discussed in more detail below on the basis of the exemplary embodiments shown in the schematic figures. In the figures.

Figure 1:
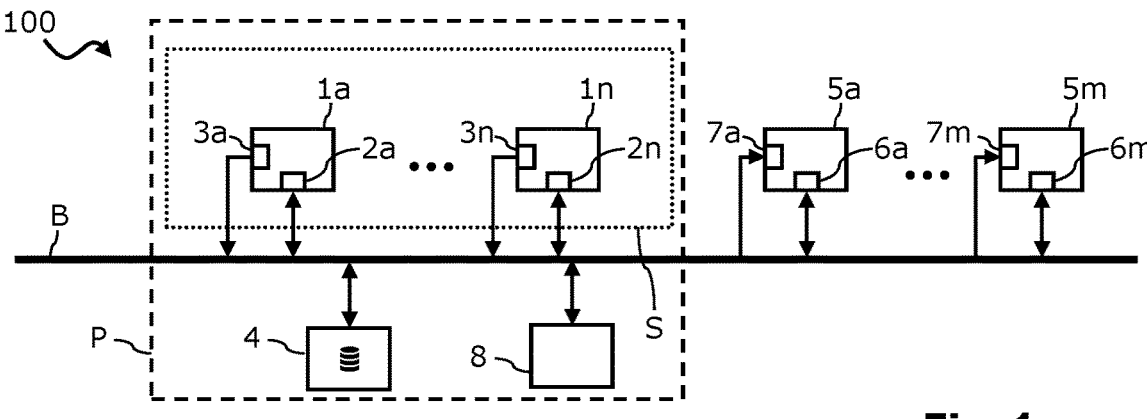
FIG. 1 schematically illustrates a block diagram of the logical structure of a network with a shared sensor grid according to some embodiments of the invention.

The attached figures are intended to provide improved understanding of the embodiments of the invention. They illustrate embodiments and serve, in conjunction with the description, for the explanation of principles and concepts of the invention. Other embodiments, and many of the stated advantages, will emerge with regard to the drawings. The elements of the drawings are not necessarily shown true to scale relative to one another. Direction-indicating terminology such as, for instance, "top", "bottom", "left", "right", "above", "below", "horizontal", "vertical", "front", "rear" and similar indications are used only for explanatory purposes and do not serve to restrict the generality to specific configurations as shown in the figures.

In the figures of the drawing, elements, features and components which are identical, functionally identical and of identical action are denoted in each case by the same reference designations unless stated otherwise.

DETAILED DESCRIPTION OF THE PREFERRED EMBODIMENTS

The detailed description includes specific details for the purpose of providing a thorough understanding of the present invention. However, it will be apparent to those skilled in the art that the present invention may be practiced without these specific details.

As used herein, network devices include any type of equipment, device, apparatus or system capable of performing functions depending on measurement data relating to a space or that can be controlled to change the condition of a space. In that regard, network devices may also be referred to herein as environmental controller assets. The measurement data utilized by such network devices is gathered by sensors integrated or installed within the network devices or by one or more sensors of a pre-designed use-case agnostic sensor grid. Such sensors may include detectors for smoke, heat, gas, flames, carbon monoxide, motion or light, detectors that measure temperature, humidity, carbon dioxide, or ambient light, detectors that may determine occupancy, presence or identity sensors (for example card readers, or RFID receivers), cameras (for example moving or still image capturing devices) and/or microphones.

Networks of sensors in a grid within the meaning of the present disclosure include a plurality of devices capable of capturing environmental information, detecting events, conducting measurement tasks and reporting the results to network gateway, servers and databases. The sensors are nodes in the network connected to one or more central network backbones configured to exchange data and control signals. Such sensor network nodes may include at least one sensor capable of gathering measurement data indicative of physical events, a processor, a node-bound local memory, and a communications interface to communicate with other sensors or with data network components such as a server over one or more of the central network backbones. The processor, the node-bound local memory and the communications interface may be implemented with general purpose elements that are (re-)programmable to a certain extent, for example via corresponding configuration software. For example, the components of the sensor nodes may be provided with firmware over-the-air (FOTA) in the scope of cyber-security measures. In some cases, the corresponding configuration software may include artificial intelligence (AI) elements that are capable of implementing machine learning functions or algorithms. Those machine learning functions or algorithms may mimic cognitive functions that humans associate with other human minds so that certain software functions may detect and extrapolate patterns and thus adapt to new circumstances based on artificially created or real-life training data sets. Such AI elements may, for example, include neural networks (such as, for example, deep neural networks, convolutional neural networks, adversarial networks, deep adversarial networks or generative adversarial networks), support vector machines, Bayesian networks, decision tree networks which may be based on Q-learning, genetic algorithms or k-means clustering.

Sensor network nodes may comprise more than one sensor of the same of different types. Each of those multiple sensors may be capable of gathering measurement data indicative of different modalities, such as, for example, sound pressure, light, acceleration, concentration of chemical substances, moisture, heat, etc. Sensors in groups of sensor nodes may be tasked in groups to handle different sensing tasks based on modality. Allocating sensing tasks to groups of sensor nodes provides redundant measurements and allows for the detection of patterns in the physical events measured by the sensors.

Figure 5:
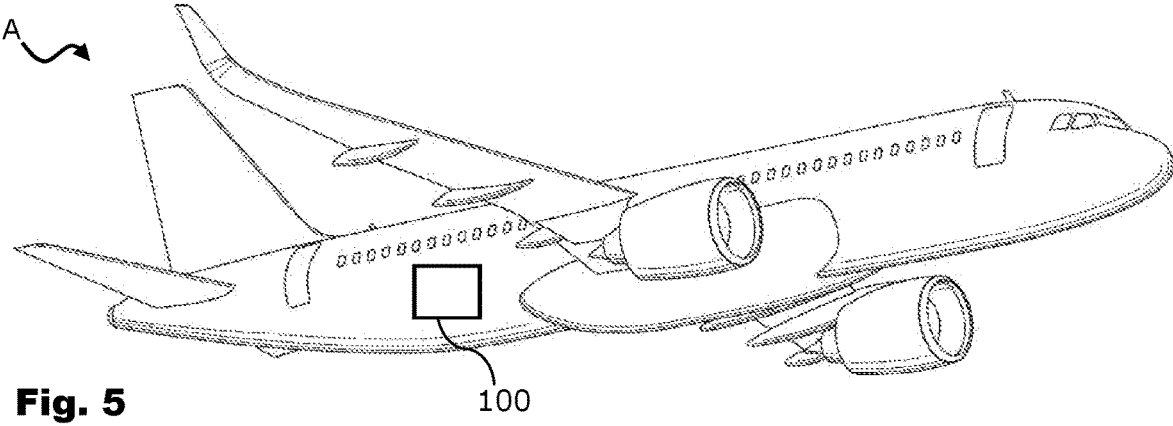
FIG. 5 schematically illustrates an aircraft having a network with a shared sensor grid according to a further embodiment of the invention.

FIG. 1 schematically illustrates a block diagram of the logical structure of a data network 100. The network 100 as illustrated and explained in conjunction with FIGS. 1 to 4 may, in particular, be a network 100 on board of an aircraft, such as, for example, the aircraft A as exemplarily shown in FIG. 5. The network 100 may in some cases be a cabin network, a cargo bay network or any other similar network used for data and control signal communication on board of an aircraft A, such as a cargo or passenger aircraft.

The network includes a central signaling backbone B to which a plurality of sensor nodes 1a to 1n and a plurality of network devices 5a to 5m are connected. The signaling backbone B may, for example, be an Ethernet backbone. Control signals and/or data signals may be conveyed over the signaling backbone B using one or more of IPv4 packets, IPv6 packets, Ethernet Powerlink packets, PPPoE packets or MPLS packets. Although only a single signaling backbone B is depicted, more than one signaling backbone B may be implemented, for example to increase the data throughput, to separate different signal routing directions, to separate payload and control signal planes and/or to be able to implement different signaling protocols. Moreover, the number of sensor nodes 1a to 1n may equal to n—as illustrated—, with n being a natural number. Additionally, the number of network devices 5a to 5m may equal to m—as illustrated—, with n being a natural number being equal to or different from n.

The plurality of sensor nodes 1a to 1n is arranged in a (virtual) sensor grid S which may installed in a network at pre-defined distributed physical locations. The sensor grid S is part of a pre-installed network P which may also comprise a data storage 4 and a sensor grid controller 8, both of which are connected to the central signaling backbone B and in data and control signal communication with each of the plurality of sensor nodes 1a to 1n in the sensor grid S. For example, in case of a sensor grid on board of an aircraft, the plurality of sensor nodes 1a to 1n may be distributed over a certain part of the aircraft, such as the passenger cabin, the cargo bays and/or functional parts like the galley, the cockpit or the crew member area. The data storage 4 and a sensor grid controller 8 may be implemented in a central network hub of the aircraft such as a server rack in an avionics equipment bay.

Each of the plurality of distributed sensor nodes 1a to 1n includes one or more sensors 3a to 3n which are configured to gather sensor measurement values, depending on the type of sensor. For example, the sensors 3a to 3n may include detectors for smoke, heat, gas, flames, carbon monoxide, motion or light, detectors that measure temperature, humidity, carbon dioxide, or ambient light, detectors that may determine occupancy, presence or identity sensors, moving or still image capturing devices and microphones. For example, so-called depth cameras may be employed which are capable of measuring the time that it takes for incident light to bounce off an illuminated object. Such depth cameras are then able to calculate distances to all points on the surface of objects in a capture image, thereby creating a three-dimensional map using the third dimension of distance in the captured surface point cloud data. Specific AI software outside the sensor grid may train model files which are then transferred to the sensor nodes with such depth cameras as initial reference.

More generally spoken, the sensor nodes 1a to 1n are devices with functionalities capable of capturing environmental information, detecting events and conducting measurement tasks. The sensor nodes 1a to 1n are then able to collect any measurement values indicative of the captured environmental information and report the measurement values in appropriately converted data signals as results to network gateways, servers, databases and any other network devices communicatively connected to the sensor nodes, such as, for example, and, in particular, the any and all of the network devices 5a to 5m.

The sensor nodes 1a to 1n each include a control interface 2a to 2n, respectively, which is used to receive and emit control signals for configuration, programming, status indication and the like. Such control signals may, for example, be output by the grid controller 8 and/or the network devices 5a to 5m via dedicated network device control interfaces 6a to 6m. Moreover, the network devices 5a to 5m may output sensor control signals Cm for requesting temporary access to or control over targeted sensor nodes 1 to 1n, the sensor control signals Cm being output over the network device control interfaces 6a to 6m to either the grid controller 8 or to the control interfaces 2a to 2n of the respective sensor nodes 1a to 1n directly. The sensor nodes 1a to 1n each include a node processor (not explicitly depicted) used to locally control operation of the one or more sensors 3a to 3n included in the respective sensor node.

The data storage 4 is configured to at least temporarily store gathered sensor measurement values of each of the plurality of distributed sensor nodes 1a to 1n. The sensor nodes 1a to 1n may send sensor measurement values as data streams or data flows Da to Dn to the data storage 4 via the signaling backbone B. The data storage 4 may be a ring buffer or a random access memory (RAM) and may be configured to route any subset of stored sensor measurement values as data streams or data flows D over the signaling backbone B. Data may be transferred automatically, continuously and/or in a publish/subscribe model.

In some implementations, the data storage 4 may be prompted to do so by corresponding request messages transmitted to the data storage 4 by either the plurality of network devices 5a to 5m or by the grid controller 8. The requested stored sensor measurement values may, in either case, be transmitted over the signaling backbone B to dedicated ones of the plurality of network devices 5a to 5m. The plurality of network devices 5a to 5m may comprise data interfaces 7a to 7m for receiving data streams D of sensor measurement values either from the sensor nodes 1a to 1n directly or from the data storage 4 upon request.

In some implementations, the data storage 4 may be configured to time-stamp gathered sensor measurement values Da to Dn before storing them. Those time-stamps may be adjusted to pre-defined latency values in communication between the corresponding distributed sensor node 1 to 1n and the data storage 4. Such pre-defined latency values may be known due to the pre-installation of the components of the network P within a physical environment, including the pre-defined wiring conditions for different installation locations of sensor nodes 1 to 1n.

In some implementations, the data storage 4 may collate a number of gathered sensor measurement values of different ones of the plurality of distributed sensor nodes 1a to 1n. Sensor measurement values that may be useful to collate may, for example, be values measured by similar types of sensors 3a to 3n at different locations or measurement values or complementing types of sensors 3a to 3n that may be synchronized by their corresponding time-stamps and sensor node locations. Such collated sets of gathered sensor measurement values may then be output over the signaling backbone B to a requesting network device 5a to 5m.

In the following, three different use case scenarios are illustrated and explained in conjunction with FIGS. 2 to 4. The use case scenarios describe how the network devices 5a to 5m may make use of the functionalities of the sensors 3a to 3m in the sensor nodes 1a to 1n in a shared sensor environment.

Figure 2:
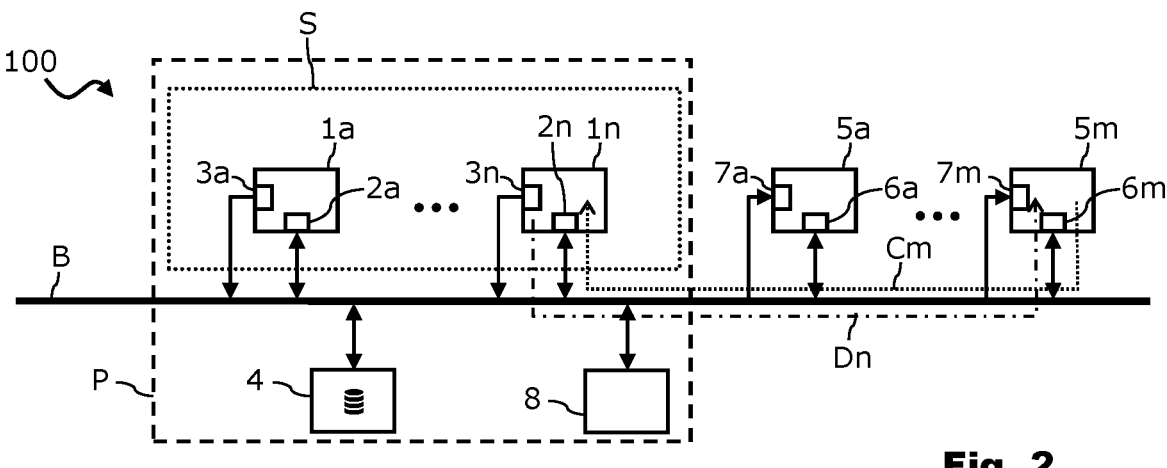
FIG. 2 schematically illustrates a block diagram of the logical structure of a network with a shared sensor grid in a first use case scenario according to some embodiments of the invention.

FIG. 2 schematically illustrates a first use case scenario with the relevant data and control signal flows in a network 100 with a shared sensor grid S in which a plurality of distributed sensor nodes 1a to 1n are connected to at least one central signaling backbone B. The network topology and distribution of the sensor nodes 1a to 1n is known to all participants in the network 100 in advance.

A network device 5m sends a sensor control signal Cm to one of the distributed sensor nodes 1n, for example via the network device control interface 6m over the signaling backbone B to the respective control interface 2n of the sensor node 1n in question. The polled sensor node 1n is triggered by the sensor control signal Cm to send selected measurement values Dn of one or more of its sensors 3n over the signaling backbone B back to the data interface 7m of the querying network device 5m. The sensor control signal Cm may, for example, only trigger the transmission of already gathered measurement values. Additionally or alternatively, the sensor control signal Cm may take over control of the targeted sensor node 1n to gather measurement values with its sensor(s) 3n based on configuration parameters contained in the sensor control signal Cm. For example, the requesting network device 5m may utilize the sensor(s) 3n of the sensor node 1n for a pre-determined amount of time or in periodic intervals to gather measurement values under specific sensor parameters, such as measurement range, precision, rate, geo-location dependent sampling rate or similar.

The queried sensor node $1n$ may, in some cases, be blocked from utilization by other network devices according to the specified query initiated by the sensor control signal Cm. This blockade may be removed once the network device $6m$ releases the queried sensor node $1n$ again, for example after a predefined time period specified by the sensor control signal Cm or after lapse of a maximum allowed utilization time period. The utilization of the functionalities of the queried sensor node $1n$ may be blocked for a predefined guard interval after release in order to guarantee an orderly handover from the control of a first network device to the control of a second network device.

Figure 3:
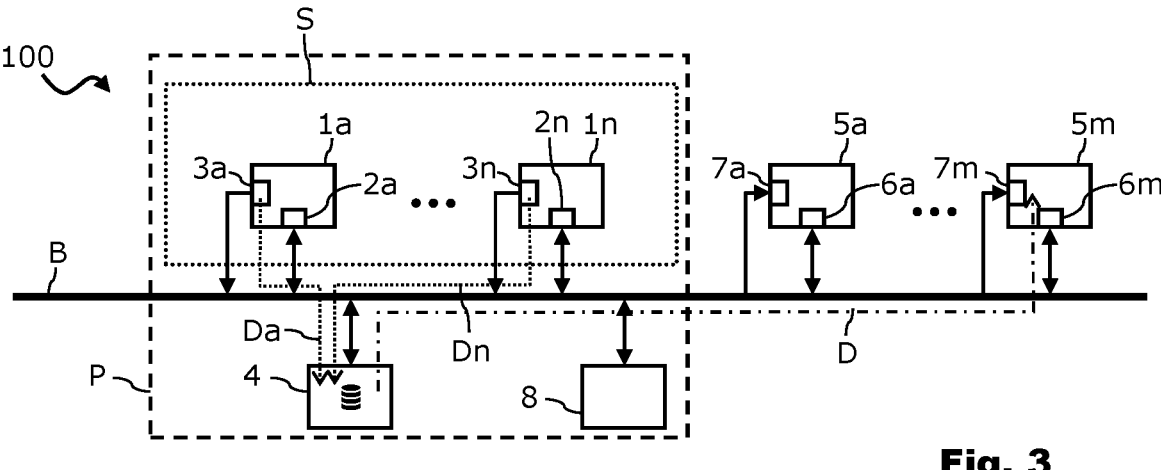
FIG. 3 schematically illustrates a block diagram of the logical structure of a network with a shared sensor grid in a second use case scenario according to some embodiments of the invention.

FIG. 3 schematically illustrates a second use case scenario with the relevant data and control signal flows in a network 100 with a shared sensor grid S in which a plurality of distributed sensor nodes $1a$ to $1n$ are connected to at least one central signaling backbone B. The network topology and distribution of the sensor nodes $1a$ to $1n$ may be, but is not necessarily known to all participants in the network 100 in advance.

In the use case scenario of FIG. 3, the plurality of distributed sensor nodes $1a$ to $1n$ gather sensor measurement values and route the gathered sensor measurement values Da to Dn over the signaling backbone B to the data storage 4. This data storage 4 at least temporarily stores gathered sensor measurement values Da to Dn of each of the plurality of distributed sensor nodes $1a$ to $1n$. In some implementations, the data storage 4 may time-stamp gathered sensor measurement values Da to Dn. Those time-stamps may adjust for pre-defined latency values in communication between the corresponding distributed sensor node and the data storage 4 so that all gathered sensor measurement values are synchronized over the network 100, irrespective of the sensor node from which the measurement values originated.

The data storage 4 may be arranged to collate certain numbers of gathered sensor measurement values Da to Dn in collated sets of gathered sensor measurement values. Such sets may compile measurement values of different ones of the plurality of distributed sensor nodes $1a$ to $1n$ having a similar type of sensors $3a$ to $3n$.

Network devices $5a$ to $5m$ connected to the signaling backbone B may retrieve gathered sensor measurement values individually and/or in collated sets from the data storage 4 over the signaling backbone B.

Figure 4:
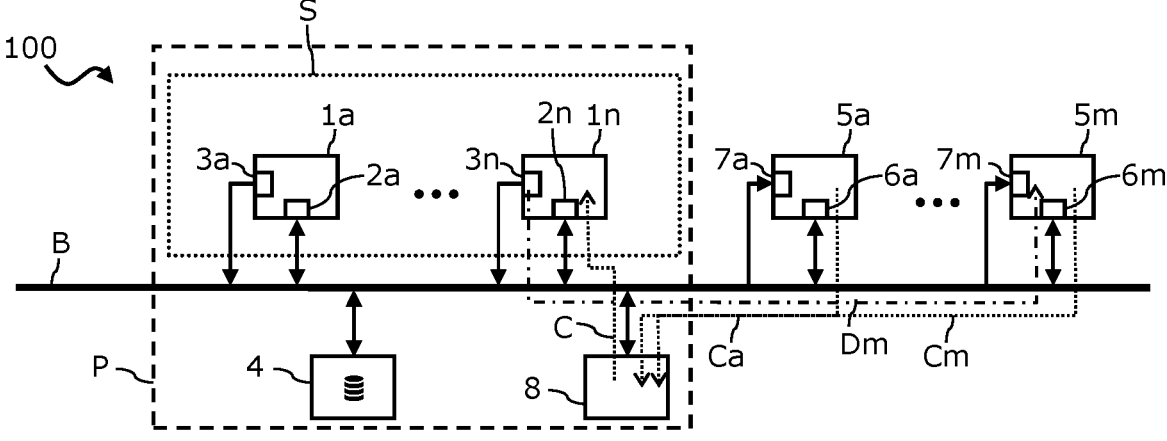
FIG. 4 schematically illustrates a block diagram of the logical structure of a network with a shared sensor grid in a third use case scenario according to some embodiments of the invention.

FIG. 4 schematically illustrates a third use case scenario with the relevant data and control signal flows in a network 100 with a shared sensor grid S in which a plurality of distributed sensor nodes $1a$ to $1n$ are connected to at least one central signaling backbone B. The network topology and distribution of the sensor nodes $1a$ to $1n$ may be, but is not necessarily known to all participants in the network 100 in advance.

In contrast to the use case scenario depicted and explained in conjunction with FIG. 2, the use case scenario of FIG. 4 involves the grid controller 8 connected to the signaling backbone B receiving sensor control signals Ca to Cm from various ones of the plurality of network devices $5a$ to $5m$ that request access to one or more sensors $3a$ to $3n$ of one or more of the plurality of distributed sensor nodes $1a$ to $1n$. The grid controller 8 retains overall control over the access to the sensor nodes $1a$ to $1n$ in that the sensor control signals Ca to Cm are compiled into grid-internal control signals C for each of the sensor nodes $1a$ to $1n$. Those grid-internal control signals C trigger the respective sensor node to send selected sensor measurement values over the signaling backbone B to the corresponding requesting network devices $5a$ to $5m$ indicated by the grid-internal control signals C. The grid-internal control signals C may be compiled based on, for example, access priority classification and/or sensor configuration information contained in the sensor control signals Ca to Cm.

Figure 6:
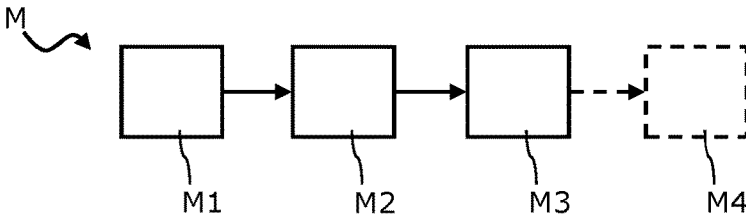
FIG. 6 shows a flowchart of a method for sharing a sensor grid in a network according to some embodiments of the invention.

FIG. 6 shows a flowchart of a method M for sharing a sensor grid connected to a network. The method M may, for example, be used in a network 100 as shown and explained in conjunction with FIGS. 1 to 4. The method M may, in particular, be used on board of an aircraft, such as the aircraft A of FIG. 5.

In a first step M1, the plurality of network devices $5a$ to $5m$ connected to the at least one central signaling backbone B in the network 100 send sensor control signals Cm to one or more of a plurality of distributed sensor nodes $1a$ to $1n$ in the sensor grid S over the central signaling backbone B. Such sent sensor control signals Cm may, for example, include an access priority classification and sensor configuration information for controlling sensor measurement parameters of particular sensors $3a$ to $3n$ of the targeted ones of the plurality of distributed sensor nodes $1a$ to $1n$.

In a second step M2, sensor measurement values Da to Dn are gathered by using one or more of the sensors $3a$ to $3n$ of the targeted distributed sensor nodes $1a$ to $1n$. In some examples, the sensor measurement values may be gathered by setting the sensor measurement parameters of the sensors $3a$ to $3n$ according to the sensor configuration information in the received sensor control signals Cm. Particularly, the sensor measurement values may be gathered in line with the received sensor control signals Cm having the highest access priority classification. In other words, the network devices $5a$ to $5m$ sending the sensor control signals with the most urgent need for using the sensors of the targeted distributed sensor nodes $1a$ to $1n$ will be given priority in gaining access to the sensor functions.

In a third step M3, the targeted distributed sensor nodes $1a$ to $1n$ which are remotely controlled by the respective network devices $5a$ to $5m$ sending the sensor control signals Cm will send selected sensor measurement values Dn over the at least one central signaling backbone B to the respective network devices $5a$ to $5m$. The selection of the sensor measurement values will be based on the content of the sent sensor control signals Cm, i.e., the respective network devices $5a$ to $5m$ control which measurement values will be collected by the sensors $3a$ to $3n$ and under what circumstances and sensor settings those measurement values will be collected.

Additionally, the gathered sensor measurement values Da to Dn may also optionally be temporarily stored in a data storage 4 that is connected to the central signaling backbone B in a fourth step M4. Such storage may improve reliability, redundancy and availability of the shared sensor grid S.

In order to improve the stringency of the representation, various features were combined in one or more examples in the detailed description above. However, it should be clear in this case that the description above is only of an illustrative and in no way restrictive nature. It is used to cover all alternatives, modifications and equivalents of the various features and exemplary embodiments. Many other examples will be immediately and directly clear to a person skilled in the art on the basis of his technical knowledge in view of the description above.

The exemplary embodiments were chosen and described in order to be able to represent the principles on which the invention is based and their possible uses in practice in the best possible manner. As a result, experts can optimally modify and use the invention and its various exemplary embodiments for the intended purpose. In the claims and the description, the terms "containing" and "having" are used as neutral concepts for the corresponding term "comprising". Furthermore, a use of the terms "a", "an" and "one" is not intended to fundamentally exclude a plurality of features and components described in such a way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A network comprising:
at least one central signaling backbone;
a plurality of distributed sensor nodes connected to the at least one central signaling backbone, each of the plurality of distributed sensor nodes comprising one or more sensors configured to gather sensor measurement values and to route gathered sensor measurement values over the at least one central signaling backbone;
a plurality of network devices connected to the at least one central signaling backbone and configured to send a sensor control signal; and
a grid controller connected to the at least one central signaling backbone and configured to control access to the plurality of distributed sensor nodes by the plurality of network devices, receive the sensor control signal from the plurality of network devices, identify which sensor node to send the sensor control signal to by compiling the sensor control signals into one or more grid-internal control signals based on a control access classification of the plurality of network devices, and send the one or more grid-internal control signals to the plurality of distributed sensor nodes, the one or more grid-internal control signals triggering a receiving sensor node to send selected sensor measurement values over the at least one central signaling backbone to the sending network devices based on a content of the one or more grid-internal control signals, wherein a topology of the network and a distribution of the plurality of distributed sensor nodes is unknown to the grid controller.

2. The network according to claim 1, further comprising:
a data storage connected to the central signaling backbone and configured to at least temporarily store gathered sensor measurement values of each of the plurality of distributed sensor nodes.

3. The network according to claim 2, wherein the data storage is configured to time-stamp gathered sensor measurement values adjusted to pre-defined latency values in communication between the corresponding distributed sensor node and the data storage.

4. The network according to claim 2, wherein the data storage is configured to collate a number of gathered sensor measurement values of different ones of the plurality of distributed sensor nodes having a similar type of sensors and to output a collated set of gathered sensor measurement values as the selected sensor measurement values over the at least one central signaling backbone.

5. The network according to claim 1, wherein the sensors of the plurality of distributed sensor nodes include one or more of detectors for smoke, heat, gas, flames, carbon monoxide, motion or light, detectors that measure temperature, humidity, carbon dioxide, or ambient light, detectors that may determine occupancy, presence or identity sensors, moving or still image capturing devices and microphones.

6. The network according to claim 1, wherein the at least one central signaling backbone is an Ethernet backbone or a wirelessly accessible signaling backbone.

7. The network according to claim 6, wherein the sensor control signals are IPv4 packets, IPv6 packets, Ethernet Powerlink packets, PPPoE packets, MPLS packets, WiFi packets, IEEE 802.15.4 packets, Bluetooth® packets or Bluetooth® Low Energy packets.

8. The network according to claim 1, wherein the network is a cabin network or a cargo bay network for an aircraft.

9. The network according to claim 1, wherein the network is on board of an aircraft.

10. An aircraft comprising a network according to claim 8.

11. A method for sharing a sensor grid connected to at least one central signaling backbone in a network, the method comprising:
sending, by a plurality of network devices connected to the at least one central signaling backbone, sensor control signals to a grid controller over the central signaling backbone;
generating, by the grid controller, a control access classification of the plurality of network devices by controlling access of the plurality of network devices to a plurality of distributed sensor nodes;
identifying, by the grid controller, which sensor node to send the sensor control signal to by compiling the sensor control signals into one or more grid-internal control signals based on the control access classification of the plurality of network devices;
distributing, by the grid controller, the one or more grid-internal control signals to one or more of the plurality of distributed sensor nodes in the sensor grid;
gathering sensor measurement values using one or more sensors of the plurality of distributed sensor nodes; and
sending, by the one or more of the plurality of distributed sensor nodes receiving the one or more grid-internal control signals, selected sensor measurement values over the at least one central signaling backbone to the sending network devices based on a content of the one or more grid-internal control signals, wherein a topology of the network and a distribution of the plurality of distributed sensor nodes is unknown to the grid controller.

12. The method according to claim 11, further comprising:
temporarily storing gathered sensor measurement values of each of the plurality of distributed sensor nodes in a data storage connected to the central signaling backbone.

13. The method according to claim 11, wherein the sent sensor control signals include an access priority classification and sensor configuration information for controlling sensor measurement parameters of sensors of the plurality of distributed sensor nodes.

14. The method according to claim 13, wherein gathering the sensor measurement values by the plurality of distributed sensor nodes is performed by setting the sensor measurement parameters of the sensors according to the sensor configuration information in the received sensor control signals.

15. The method according to claim 13, wherein gathering the sensor measurement values by the plurality of distributed sensor nodes is performed in line with the received sensor control signals having the highest access priority classification.

16. The method according to claim 11, wherein the network is on board of an aircraft.

\* \* \* \* \*